United States Patent [19]

Fage

[11] 4,182,501
[45] * Jan. 8, 1980

[54] THRUST REVERSER FOR JET ENGINE FORMING ACTIVE EXTENSION OF JET TUBE

[75] Inventor: Etienne Fage, Jouy en Josas, France

[73] Assignee: Astech, Meudon La Foret, France

[*] Notice: The portion of the term of this patent subsequent to Dec. 12, 1995, has been disclaimed.

[21] Appl. No.: 881,044

[22] Filed: Feb. 24, 1978

Related U.S. Application Data

[63] Continuation-in-part of Ser. No. 784,562, Apr. 4, 1977, Pat. No. 4,129,269.

[30] Foreign Application Priority Data

Mar. 4, 1977 [FR] France .................................. 77 06360

[51] Int. Cl.² .................... B64C 15/06; B64D 33/04
[52] U.S. Cl. .................... 244/110 B; 60/226 A; 60/230; 239/265.19; 239/265.37
[58] Field of Search ............. 244/110 B; 60/229, 230, 60/226 A; 239/265.19, 265.25, 265.29, 265.31, 265.33, 265.35, 265.37; 49/485

[56] References Cited

U.S. PATENT DOCUMENTS

| | | | |
|---|---|---|---|
| 3,550,855 | 12/1970 | Feld et al. | 60/230 X |
| 3,604,662 | 9/1971 | Nelson et al. | 244/110 B X |
| 3,684,182 | 8/1972 | Maison | 239/265.25 |
| 4,129,269 | 12/1978 | Fage | 244/110 B |

*Primary Examiner*—Barry L. Kelmachter
*Attorney, Agent, or Firm*—Merriam, Marshall & Bicknell

[57] ABSTRACT

The invention relates to a thrust reverser comprising two symmetrical doors, approximately hemi-truncated in shape, pivotally mounted about an axis which is transverse and substantially diametrical to the jet of a jet engine and which is disposed downstream of the jet exhaust pipe thereof, the doors occupying a folded, or stowed, position in which they determine a sleeve forming part of the fairing of the engine and fuselage of the aircraft, or an unfolded, or opened out, position in which they are disposed transversely with respect to the jet, wherein the structure of each of the doors is such that, in stowed position, the inner volume of the sleeve forms a useful extension of the jet pipe of the engine. The invention finds particular application in the braking of aircraft.

6 Claims, 5 Drawing Figures

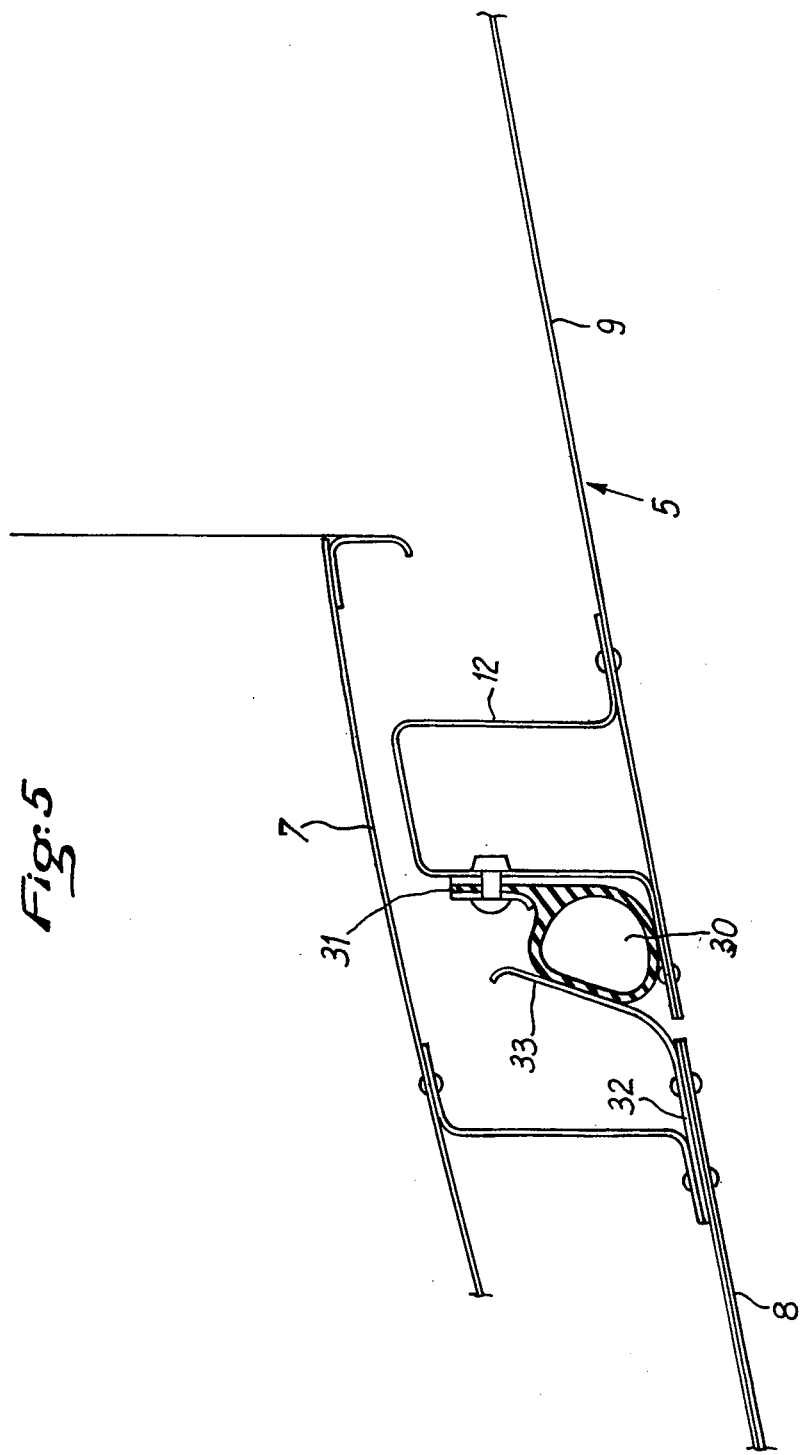

THRUST REVERSER FOR JET ENGINE FORMING ACTIVE EXTENSION OF JET TUBE

This is a continuation-in-part of copending application Ser. No. 784,562, filed Apr. 4, 1977, now U.S. Pat. No. 4,129,269.

The present invention relates to a thrust reverser for a jet engine, with or without by-pass of the main jet, mounted in particular on an aircraft.

With a view to shortening the distance run by an aircraft between landing and stopping or to increasing safety when braking on a damp or icy runway, a reverser is known to be used on jet-engined aircraft, which produces a braking thrust.

To this end, a thrust reverser is already known which comprises two symmetrical doors, approximately hemitruncated in shape, pivotally mounted about an axis which is transverse and substantially diametrical to the jet of said engine and which is disposed downstream of the jet exhaust pipe thereof, said doors occupying a folded, or stowed, position in which they determine a sleeve forming an extension of a section of the aircraft such as the fuselage and the fairing of an engine, or an unfolded, or opened out, position in which they are disposed transversely with respect to said jet.

In this known reverser, each door is "double-skinned" and, in stowed position, the inner skins of the two doors form a convergent portion followed by a quasi-cylindrical or slightly divergent portion, connected by a ridge adjacent the edge of the jet pipe of the engine, so that said quasi-cylindrical or slightly divergent portion constitutes, when the doors are in folded or stowed position, an unnecessary extension of the engine. In fact, the section of this extension being cylindrical or slightly divergent, the expansion of the gases occurs upon exit from the jet pipe, inside this very extension.

It is an object of the invention to provide a door structure for a thrust reverser enabling the dimensions of said reverser to be reduced and the weight thereof to be lightened, whilst increasing the aerodynamic characteristics of the reversed jet. To this end, according to the invention, the structure of each of the doors is such that, in stowed position, the inner volume of said sleeve forms a useful extension of the jet pipe of the engine, i.e. acts at least partly as a jet pipe end.

The inner diameter of at least the rear part of the truncated sleeve formed by said folded doors is, to this end, smaller than the diameter of that part of the jet pipe of the engine terminating inside said sleeve.

It will readily be understood, since this sleeve serves partly as jet pipe for the engine, that the actual jet pipe of said latter can be shorter than usual and, consequently, the total length of the engine provided with its thrust reverser may be reduced.

In known manner, each of said doors may be formed by a single skin or thin wall and, at least near its rectilinear longitudinal edges and its leading circular edge, said at least substantially hemitruncated skin may be reinforced on its concave face by stiffening sections, taking the shape of said concave face and projecting with respect thereto. Moreover, on the rear side, said at least substantially hemi-truncated skin may comprise a crescent-shaped which may be separated from the rest of said skin, on the concave face thereof, by a stiffening arc. Near said letter, a lining may be provided on the concave face of the at least substantially hemi-truncated skin, which lining in section through a diametrical plane of said skin, presents a ridged or V-shaped section of which the point most remote from said skin is at the level of said stiffening arc, this lining covering on one side of said arc, said crescent-shaped extension, and, on the other side, less than half of the length of the concave face separating the stiffening arc from the leading edge of the door. In this case, it is advantageous if that part of the lining covering the crescent-shaped extension forms the extreme rear port of the jet pipe of the engine, the diameter of this port being smaller than the exit diameter of the actual jet pipe.

As used herein, the jet pipe of the engine is deemed to include a peripheral fan duct if present, and the diameter of the jet pipe of a fan duct jet engine is considered to be that of the entire assembly including the annular cold gas duct. Accordingly, when the jet pipe of the engine comprises a peripheral fan duct, the inner diameter of the rear part of the sleeve formed by the doors is smaller than the outer diameter of the annular cold gas duct.

Of course, for the sleeve constituted by the two doors to be able to form the extension of the jet pipe, there must be a good seal, when the doors are in folded position, on the one hand between the leading edges of the doors and the corresponding part of the fairing of said engine, and, on the other hand, between the opposite longitudinal edges of said doors.

To this end, each door may comprise, along said longitudinal and leading edges, a suitable continuous seal. In an advantageous embodiment, this continuous seal may be formed by a hollow tube made of fabric-reinforced silicon rubber, for example.

The seal is preferably disposed on the concave face of the doors and, when said latter comprise peripheral stiffening sections as mentioned hereinabove, the seal is fixed to said sections. To this end, it may comprise a longitudinal fixing tongue.

In this way, along the longitudinal edges of the doors which are located opposite when said doors are folded, the seal may be ensured by the direct cooperation of the adjacent longitudinal portions of the seals of the two doors. At the front, the seal between the fairing of the engine and the doors may be ensured by the cooperation of said seal with a special bearing face, provided on the fairing. Such a bearing face may be constituted by a section made fast with the rear edge of the fairing.

The invention will be more readily understood on reading the following description with reference to the accompanying drawings, in which:

FIG. 5 illustrates, on a larger scale, how the seal is effected between the fairing of the engine and the doors of the reverser.

In these Figures, like references designate like elements.

Figure 1:
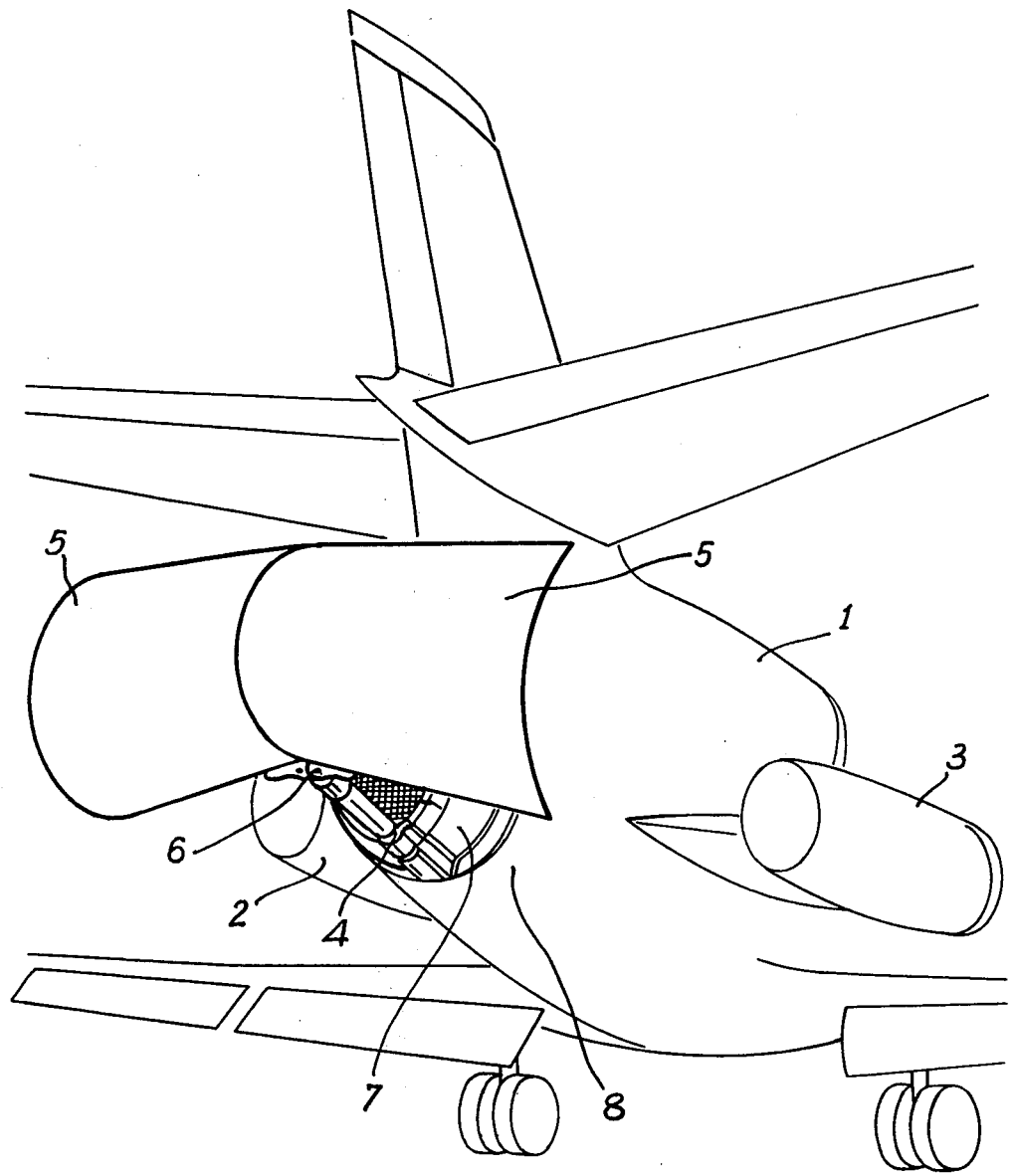
FIG. 1 shows the rear part of an aircraft, provided with a thrust reverser according to the invention.

Referring now to the drawings, FIG. 1 shows the rear 1 of an aircraft, comprising three jet engines 2, 3 and 4, namely two side engines 2 and 3 and a central one 4. This engine 4 is to a large extent hidden by a thrust reverser, comprising two reverser doors 5, pivoted about a hinge 6 enabling said doors to pivot about a vertical axis disposed downstream of the fan duct of the engine 4.

Figure 2:
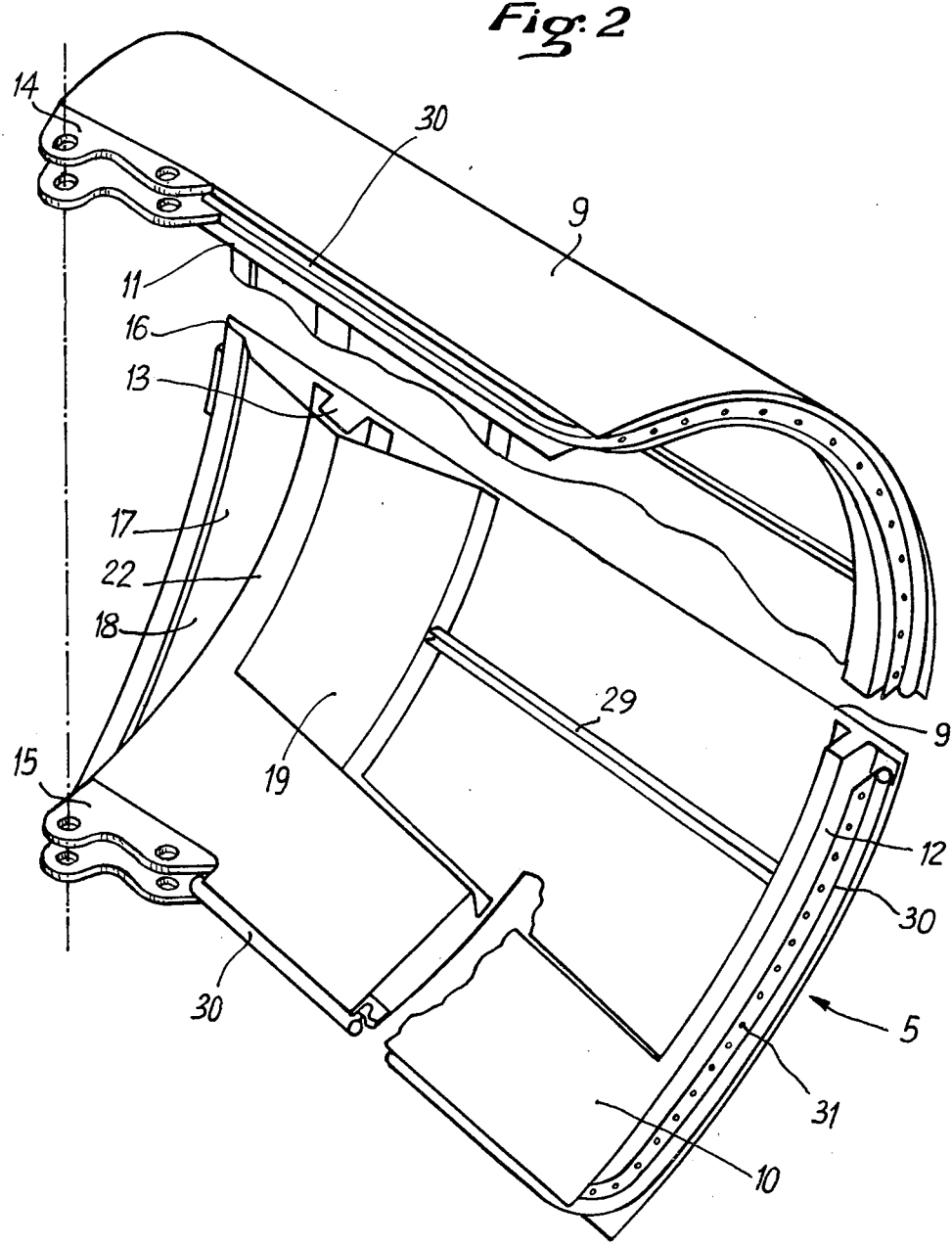
FIG. 2 shows, in perspective, a door of the thrust reverser according to the invention.

This hinge 6 is mounted on the fan duct 7 of said engine. In FIG. 1, the reverser doors are shown in unfolded position, i.e. in a position adapted to reverse the jet, whilst in FIG. 3, they are shown to be in stowed position. In this case, they are in line with the fairing 8 of the engine 4. The reverser doors 5 are identical and interchangeable so as to be adapted to be mounted equally well on the left and on the right. As shown in FIG. 2, each door 5 may be formed by a thin wall 9, generally called a "skin", at least approximately in the form of half a frustum of a cone. On its concave inner face, the thin skin 9 is stiffened at its periphery by a frame formed by longitudinal beams 10 and 11 along its rectilinear edges and arcs 12 and 13 near its leading and rear curvilinear edges. It may also comprise additional small longitudinal stiffeners 29.

The beams 10 and 11 and arcs 12 and 13 are constituted by sections of which the cross-section is in the form of a U, an omega or the like and are fixed on the inner concave face of the skin 9 by their edges.

The skin 9 and the beams and arcs 10 to 13 may be made of "INCONEL 625" (Registered Trade Mark) or any other suitable refractory alloy and the different elements of a door 5 may be assembled by riveting.

Two pivot fittings 14 and 15 are arranged at the rear arc 13, for attachment to the hinge device 6. The fittings 14 and 15 are located along the rectilinear edges of the door 5. Beyond the arc 13 and the fittings 14 and 15, instead of being limited by a circular edge at right angles to the axis of the frustum of cone, the skin 9 comprises a crescent-shaped projection 16, the maximum width of which is in the axial plane of symmetry of the skin 9. A lining 17 envelops the arc 13 and joins the inner face of the skin 9 by inclined faces 18 and 19. The inclined face 18 covers the whole of the projection 16, whilst the inclined face 19 covers only a small part of the remaining inner face of the skin 9 (less than half).

When the doors 5 are in folded position, the inclined faces 18 form a convergent duct disposed opposite the port 20 of the fan duct of the engine 4 (cf. FIG. 3), the minimum diameter d of this convergent duct being smaller than the diameter D of the port 20 of the fan duct. Moreover, the inclined faces 18 come substantially in the line with the contour of said fan duct. In this way, the faces 18 form an extension of the jet pipe of the engine 4, so that it may be considered that the doors 5 constitute an active extension of the actual jet pipe. On the other hand, since the inclined faces 19 of the linings cover the inner concave face of the skins 9 only partially, there is an annular space 21 between the edge 20 of the fan duct and the ridge 22 (corresponding to the arc 13) of the lining 17, which ridge corresponds to the joining of inclined faces 18 and 19.

It will be noted that the aerodynamic loads applied to the doors 5 when they are unfolded, are transmitted to the pivot fittings 14 and 15. These may be constituted by castings made of a special stainless steel.

The structure of the doors 5 comprising a skin 9 and peripheral stiffeners 10 to 13 gives these doors an excellent rigidity in flexion and in torsion. As has be seen hereinabove, in addition to its structural function of rigidification, the frame 10 to 13 allows the reversed jet of the gases leaving the engine 4 to be best deflected, due to the optimum choice of the height of said frame with respect to the inner concave face of the skin 9.

Figure 4:
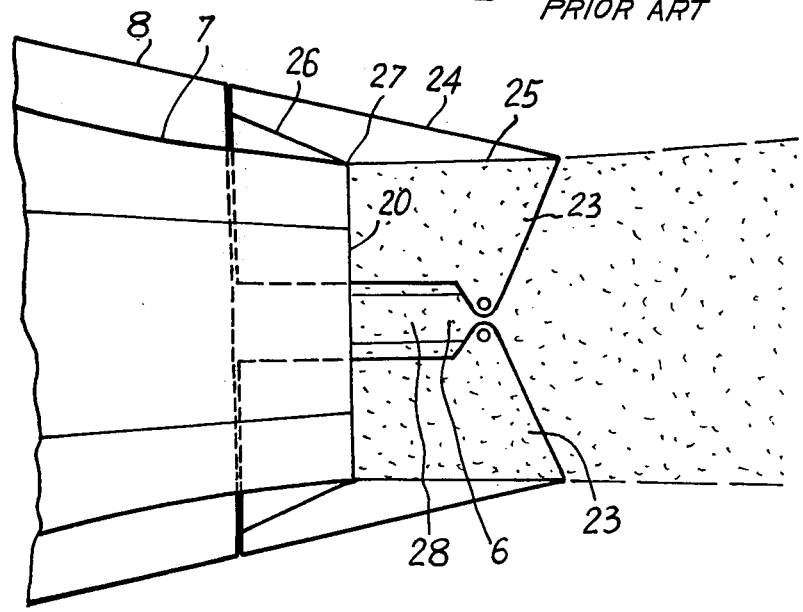
FIG. 4 shows, in schematic longitudinal section, a known thrust reverser in folded position.

FIG. 4 shows a known thrust reverser provided with doors 23, also pivoted about a hinge 6, but of which the structure is a so-called "double-skin" structure, since they are constituted by an outer truncated skin 24 and an inner ridged skin, composed of a quasi-cylindrical or divergent part 25 and a conical part 26, connected along a circular ridge 27. In stowed position (FIG. 4), the circular ridge 27 is adjacent the edge 20 of the fan duct and the part 25 comes in line therewith. There is no annular space 21 in this case, but the extension 25 being cylindrical or slightly divergent, the doors 23 cannot form an active extension of the jet pipe of the engine 4. On the contrary, due to the shape of the wall 25, the expansion of the gases leaving the jet pipe occurs completely within the sleeve formed by said doors.

Figure 3:
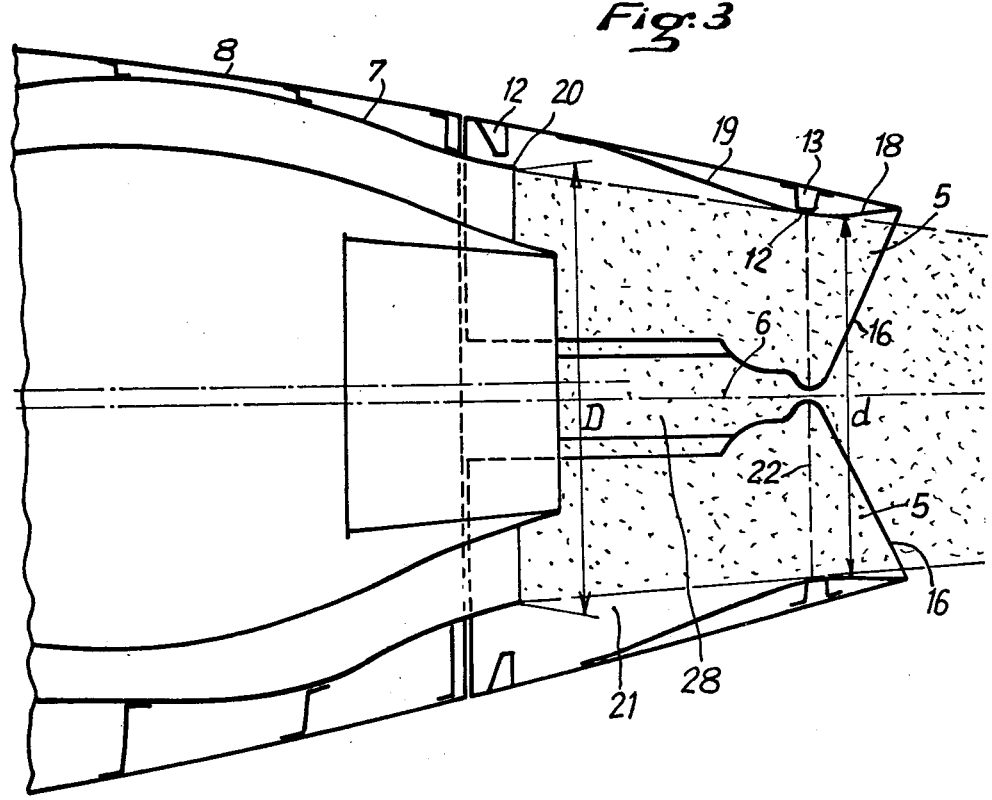
FIG. 3 illustrates, in schematic section, the thrust reverser according to the invention.

The major advantage of the thrust reverser according to the invention over the known thrust reverser shown in FIG. 4, is clearly seen on comparing FIGS. 3 and 4, in which the shape of the jets, when the reversers are in stowed position, has been schematically indicated.

It is readily understood that, in the case of the invention, as the doors 5 constitute an active extension of the jet pipe of the engine 4, the engine 4-reverser 5 assembly may be shorter than in the known reverser shown in FIG. 4.

Apart from the saving in length, there is also an obvious weight saving. The reduction in the length of the doors contributes numerous advantages. It is known, in fact, that a fixed hinge for the doors of the reverser necessarily involves an extension of the fairing, downstream of the exhaust plane of the fan duct and generally that such an extension is the cause of an increase in the external drag. Consequently, the thrust reverser according to the invention makes it possible to reduce the influence on the drag. Furthermore, the doors being smaller, the hinge 6 thereof is less remote from the edge 20 of the fan duct and its support arm or arms 28 may be shorter. This results in the hinge system of the doors being more rigid and less sensitive to vibrations.

Moreover, the presence of the annular space 21 between the edge 20 and the ridge 22 improves positioning of the doors. In particular, even when the axis of the fairing 8 does not coincide with the axis of the jet pipe, it enables identical doors 5 to be adapted whilst respecting the continuity of the external lines.

Experience has shown that the presence of the annular space 21 does not, in direct jet, cause any measurable loss of power of the engine 4, and does not hinder the action of the curved inclined faces 18 as extension of the jet pipe of the engine 4. This is due to the fact that, in operation, a "fluid wall" is established between the edge 20 and the ridge 22, the exact form of which adapts itself to the conditions of flight and functioning of the engine.

A good geometric adaptation will thus determine, at low flight velocities (taking off and landing in particular), a depression in the annular space 21, which will cause a small additional flow to be drawn along the leading arc 12.

As may be seen in FIG. 2, each door 5 comprises on its periphery, on its inner concave face, a continuous seal 30 (not shown in FIG. 3) running along its two rectilinear longitudinal edges and its rear curved edge. The seal 30 is fixed on the stiffening sections 10, 11 and 12. When the doors are in folded position, the rectilinear portions of the seals 30 of the two doors cooperate directly to ensure the seal at the junction of the doors. FIG. 5 shows in greater detail how the seal is made between the fairing 8 and the doors 5. The tubular seal 30 comprises a longitudinal tongue 31 due to which it is fixed to the stiffening arc 12 (and also to the sections 10 and 11).

Opposite said seal 30, on the circular edge of the fairing 8, is fixed a section 32, comprising an oblique tongue 33 against the outer face of which the seal 30 is applied.

It will be readily understood that, due to the seal 30, a good tightness is ensured between the doors 5 and the fairing 8, on the one hand, and between the doors 5 themselves, consequently, said doors, as explained hereinabove, form an active extension of the jet pipe of the engine.

What we claim is:

1. A thrust reverser adapted for use with an aircraft jet engine having a jet exhaust pipe, said reverser comprising two symmetrical doors, each of which is at least substantially hemi-truncated in form, having opposed arcuate leading and trailing edges and opposed rectilinear side edges, said doors being mounted to pivot about an axis adjacent said trailing edges, said axis being transverse and substantially diametrical with respect to the jet of said engine, and which is disposed downstream of the jet exhaust pipe thereof, each of said doors comprising a thin wall having a concave inner face and a convex outer face, and elongated reinforcing members attached to said concave face adjacent the arcuate leading and trailng edges and the rectilinear side edges thereof, said reinforcing members projecting inwardly from said concave face, said wall having a crescent-shaped section at its rearward end, defined by the trailing edge of said wall and said reinforcing member adjacent thereto, said section having an inner concave and an outer convex face which form continuations of the concave and convex faces of said wall, an arcuate lining having two faces which intersect to form a trough having an approximately V-shaped cross-section, said lining spanning the reinforcing member adjacent the trailing edge of said door with said reinforcing member in the trough of said lining, said lining faces comprising a rearward face covering substantially all of the concave face of said crescent-shaped section and a forward face covering less than half of the concave face of said wall, each door being movable between a first, folded position in which said outer face forms an extension of a section of said aircraft, and a second, unfolded position in which said outer face is disposed transversely with respect to said jet, said rearward faces forming, in the folded position of said doors, a converging extension of said jet pipe having a substantially circular rear port with a diameter smaller than the exit diameter of said jet pipe.

2. A thrust reverser as claimed in claim 1 wherein said jet exhaust pipe is surrounded by an annular fan duct, and wherein the diameter of said rear port is smaller than the outer diameter of said fan duct.

3. A thrust reverser as claimed in claim 1 or claim 10, further provided with sealing means effective to form seals between said opposed side edges of said doors and between each door and said section of said aircraft, when said doors are in said folded position.

4. A thrust reverser as claimed in claim 3, wherein said sealing means comprises in part a deformable tube disposed on the concave face of each door.

5. A thrust reverser as claimed in claim 4, in which said tube comprises a longitudinal fixing tongue by means of which said tube can be held in operative position.

6. A thrust reverser as claimed in claim 5 wherein said sealing means further comprises a bearing face disposed on said section against which said tube bears in sealing relationship when said doors are in said folded position.

* * * * *

UNITED STATES PATENT AND TRADEMARK OFFICE
CERTIFICATE OF CORRECTION

PATENT NO. : 4,182,501
DATED : January 8, 1980
INVENTOR(S) : ETIENNE FAGE

It is certified that error appears in the above-identified patent and that said Letters Patent are hereby corrected as shown below:

Col. 6, line 25, "claim 10" should be

--claim 2--.

Signed and Sealed this

Twenty-second Day of April 1980

[SEAL]

Attest:

SIDNEY A. DIAMOND

Attesting Officer     Commissioner of Patents and Trademarks